UNITED STATES PATENT OFFICE.

HOWARD F. CHAPPELL, OF NEW YORK, N. Y.

MANUFACTURE OF SULFATE OF POTASH AND ALUMINA.

1,070,324.  Specification of Letters Patent.  Patented Aug. 12, 1913.

No Drawing.  Application filed January 13, 1912.  Serial No. 671,086.

*To all whom it may concern:*

Be it known that I, HOWARD F. CHAPPELL, a citizen of the United States, residing in the borough of Manhattan, in the city, county, and State of New York, have invented certain new and useful Improvements in Manufacture of Sulfate of Potash and Alumina; and I do hereby declare the following to be a full, clear, and exact description of the invention, such as will enable others skilled in the art to which it appertains to make and use the same.

This invention relates to the manufacture of sulfate of potassium and high-grade oxid of aluminum, from natural deposits variously known as alum stone, alum rock and alunite.

The practice of the invention involves a calcining operation designed to convert the alkali compounds contained in the alunite into sulfates soluble in water, and the aluminum compounds contained in the alunite into aluminum oxid insoluble in water. The soluble sulfates are then dissolved out of the calcined ore with water, by any ordinary method of leaching; thereby leaving the aluminum oxid. The soluble sulfates are recovered from the leachings.

The invention is of particular industrial importance for the economical utilization of those alum stones and alum rock deposits which are so far from the market that their transportation in the raw state, or their conversion into potash alum, according to methods heretofore practised, is either entirely unremunerative or at least highly expensive.

The alum stone or alum rock, as mined, is passed through crushers and sizing screens to separate the ore into lumps and fines. The fines are further crushed and sized to pass through a screen of ⅛ inch mesh. The lumps will usually vary from two inches in diameter downward.

The alum stone or alunite is calcined in any suitable furnace of ordinary construction; a cupola kiln or shaft furnace, such as is used for calcining lime, is well adapted to calcine alum stone where it is in lump form and does not fall to powder or decrepitate by the heat of the furnace. A rotating cylinder of similar construction to those used in calcining lime and cement is especially adapted to the calcining of alum stone when in the condition of granules or powder, and requires less fuel than other types of furnaces. A reverberatory furnace of ordinary construction or a muffle roaster supplied internally with a current of air can be used for the purpose of calcining alum stone or alunite, but the fuel cost will be greater.

It is very desirable to treat the alunite in as strong a current of air as is permissible without too great an expenditure of fuel. To this end, when the alunite is treated in the kiln or shaft furnace, if oil is used as fuel, it is injected by steam into a suitable combustion chamber wherein the amount of air admitted may be regulated to give thorough combustion, and the products of combustion then pass into an adjacent supplemental chamber, having air admission ports to regulate the heat of the products of combustion; whereupon they pass into the base of the cupola kiln through suitable ports or twyer openings and then pass through the charge. If bituminous coal is used for fuel, supplementary air-ports are arranged between the fire-boxes and the kiln, or other methods are taken to insure the complete combustion of the fuel gases and a sufficient air-supply, as a reducing flame is to be avoided. Under these conditions, in the oxidizing atmosphere incident to the operation, I find that the resultant alumina is rendered insoluble in water, without any substantial production of potassium aluminate, at calcining temperatures which may be varied according to the analysis of the alum stone or alum rock treated (particularly with reference to its percentage of silica present) from 750° C. to 1000° C. and upward. That is to say, at these temperatures, substantially all of the aluminum compounds in the alunite, appear in the calcined final product as insoluble oxid of aluminum, it being feasible to continue the calcining operation until this result is effected, without producing any material proportion of potassium aluminate, even when the calcining temperature is in the higher range of 1000° C. and beyond. Where the alum stone or alum rock contains as low a percentage of silica as one or two per cent., I find it suitable to employ a temperature of from 800° C. to 1000° C., as, for instance, the temperature at which the usual diagonally slotted saggar clay cones rated to indicate that temperature range (used in ceramic ware kilns) begin to fuse at the exposed edges of the slot; and, in fact, I recommend this high range of temperature in calcining alunite whatever the percentage of silica present. It is also my experience that the fines may be calcined to advantage at lower average temperatures than the lumps.

Whatever kind of furnace is used to calcine the alum stone, and whether the ore is calcined in lump or granular size or in pulverized form, care should be taken not to expose the ore suddenly to a high temperature, as some forms of alunite under such conditions decrepitate, puff up and are converted into a fine flocculent material which is carried away in the draft, and which has a tendency to clog the furnace and otherwise interfere with the operation of the process. On this account, the ore is introduced into the calcining furnaces at the farthest end from the source of heat and is gradually moved toward the fuel end, and is thus gradually subjected to a progressive increase of temperature until the heat is sufficient to convert the potassium compounds and other alkali compounds contained in the alunite into sulfates soluble in water, and to convert the aluminum compounds of the alunite into aluminum oxid.

Having thus described my invention, what I claim is:

1. The process of obtaining aluminum oxid and sulfate of potassium from natural deposits of alum stone, alum rock, and alunite, which comprises submitting the same to a temperature sufficient to convert substantially all of the potassium compounds contained therein into potassium sulfate, and substantially all of the aluminum compounds into insoluble aluminum oxid and thereupon lixiviating out the potassium sulfate; substantially as described.

2. The process of obtaining aluminum oxid and sulfate of potassium from natural deposits of alum stone, alum rock, and alunite, which comprises submitting the same to a temperature higher than 750° C. until the aluminum compounds present are converted into insoluble aluminum oxid and the potassium compounds present are converted into potassium sulfate, and thereupon lixiviating out the potassium sulfate; substantially as described.

3. The process of obtaining aluminum oxid and sulfate of potassium from natural deposits of alum stone, alum rock, and alunite, which comprises submitting the same to a temperature of about 800–1000° C., until the aluminum compounds present are converted into insoluble aluminum oxid and the potassium compounds present are converted into potassium sulfate, and thereupon lixiviating out the potassium sulfate; substantially as described.

In testimony whereof I affix my signature, in presence of two witnesses.

HOWARD F. CHAPPELL.

Witnesses:
LEON WALTER ROSENTHAL,
MINERVA LOBEL.